(12) United States Patent
Steinmüller et al.

(10) Patent No.: US 12,246,990 B2
(45) Date of Patent: Mar. 11, 2025

(54) FILLER MADE FROM SORTED WASTE MATERIALS FOR THE PRODUCTION OF CEMENT-BOUND SHAPED BODIES

(71) Applicant: TERION AG, Buchs (CH)

(72) Inventors: Jürgen Steinmüller, Ventnor (GB); Peter Merkel, Kitzingen (DE); Martin Dreismann, Rottendorf (DE)

(73) Assignee: Terion AG, Buchs (CH)

( * ) Notice: Subject to any disclaimer, the term of this patent is extended or adjusted under 35 U.S.C. 154(b) by 0 days.

(21) Appl. No.: 17/270,336

(22) PCT Filed: Oct. 1, 2019

(86) PCT No.: PCT/EP2019/076630
§ 371 (c)(1),
(2) Date: Feb. 22, 2021

(87) PCT Pub. No.: WO2020/070151
PCT Pub. Date: Apr. 9, 2020

(65) Prior Publication Data
US 2021/0340064 A1 Nov. 4, 2021

(30) Foreign Application Priority Data
Oct. 1, 2018 (DE) .................. 10 2018 124 254.9

(51) Int. Cl.
| | | |
|---|---|---|
| *B28B 17/02* | (2006.01) | |
| *C04B 18/04* | (2006.01) | |
| *C04B 18/20* | (2006.01) | |
| *C04B 18/24* | (2006.01) | |
| *C04B 18/26* | (2006.01) | |
| *C04B 18/30* | (2006.01) | |
| *C04B 20/00* | (2006.01) | |
| *C04B 20/02* | (2006.01) | |
| *C04B 28/02* | (2006.01) | |
| *C04B 18/28* | (2006.01) | |
| *C04B 22/06* | (2006.01) | |
| *C04B 22/14* | (2006.01) | |

(52) U.S. Cl.
CPC .............. *C04B 18/30* (2013.01); *B28B 17/02* (2013.01); *C04B 18/0481* (2013.01); *C04B 18/20* (2013.01); *C04B 18/241* (2013.01); *C04B 18/26* (2013.01); *C04B 20/0048* (2013.01); *C04B 20/023* (2013.01); *C04B 20/026* (2013.01); *C04B 28/02* (2013.01); *C04B 18/28* (2013.01); *C04B 22/064* (2013.01); *C04B 22/148* (2013.01); *Y02W 30/91* (2015.05)

(58) Field of Classification Search
CPC ..... C04B 18/30; C04B 18/0481; C04B 18/20; C04B 18/241; C04B 18/26; C04B 20/0048; C04B 20/023; C04B 20/026; C04B 28/02; C04B 18/28; C04B 22/064; C04B 22/148; C04B 18/165; C04B 18/167; C04B 18/24; C04B 14/06; C04B 24/04; C04B 18/04; C04B 18/305; B28B 17/02; Y02W 30/91

See application file for complete search history.

(56) References Cited

U.S. PATENT DOCUMENTS

| | | | | |
|---|---|---|---|---|
| 2009/0039541 A1* | 2/2009 | Vom Orde | ............... | B09B 3/25 |
| | | | | 106/638 |
| 2015/0259252 A1* | 9/2015 | Ghalayini | ................. | D01F 6/06 |
| | | | | 52/750 |

FOREIGN PATENT DOCUMENTS

| | | | |
|---|---|---|---|
| CN | 103539425 A | 1/2014 | |
| DE | DD-240195 A1 * | 10/1986 | |
| DE | 19611454 A1 | 9/1997 | |
| EP | 2374767 A2 * | 10/2011 | ............. C04B 14/06 |
| FR | 2700163 A1 * | 7/1994 | ........... A47B 96/205 |
| FR | 2718736 A1 * | 10/1995 | ........... C04B 28/065 |
| RU | 2688718 C1 | 5/2019 | |
| SU | 606847 A1 | 5/1978 | |
| SU | 1699976 A1 | 12/1991 | |

OTHER PUBLICATIONS

S Pantawee, T Sinsiri, C Jaturapitakkul, P Chindaprasirt, Utilization of hemp concrete using hemp shiv as coarse aggregate with aluminium sulfate [Al2(SO4)3] and hydrated lime [Ca(OH)2] treatment, Construction and Building Materials, (2017) 156, 435-442. DOI: 10.1016/j.conbuildmat.2017.08.181. (Year: 2017).*
EP-2374767-A2, machine translation (Year: 2011).*
FR-2700163-A1, machine translation (Year: 1994).*
DD-240195-A1, machine translation (Year: 1986).*
FR-2718736-A1, machine translation (Year: 1995).*

* cited by examiner

*Primary Examiner* — Anthony J Green
*Assistant Examiner* — Marites A Guino-O Uzzle
(74) *Attorney, Agent, or Firm* — 24IP Law Group USA, PLLC; Timothy R DeWitt

(57) ABSTRACT

A filler for production of cement-bound shaped bodies, comprising a material group mixture of comminuted and sorted waste materials, conditioned with chemical reagents/compounds in the presence of water, wherein the material group mixture is composed of comminuted and sorted waste materials, selected from the following material groups:
PPK: paper, paperboard, cardboard
plastics
inert material
textiles
wood
which are mixed according with a mass-related material group vector and then comminuted.

21 Claims, 1 Drawing Sheet

FILLER MADE FROM SORTED WASTE MATERIALS FOR THE PRODUCTION OF CEMENT-BOUND SHAPED BODIES

BACKGROUND OF THE INVENTION

Field of the Invention

The present patent application relates to a filler made from sorted residual materials for the production of cement-bound mouldings, to a moulding produced using the filler and to a process for producing the same, as described by the independent patent claims.

Brief Description of the Related Art

Conventional concrete is made from cement, aggregate (sand, gravel or grit) and mixing water. It may also contain concrete additives and admixtures (e.g., setting accelerators, retarders). According to DIN EN 206-1 (see also DIN 1045-1), concrete is classified into heavy concrete (pT: >2600 kg/m3), normal concrete (pT: >2000 to 2600 kg/m3) and light concrete (pT: 800 to 2000 kg/m3) depending on the dry density (pT). For dry densities pT<800 kg/m3 one speaks of infra- or ultra-light concrete, to which the standard DIN EN 206-1 does not apply. According to DIN EN 206-1, the minimum cement content in the concrete bodies is between 260 and 360 kg/m3 depending on the exposure class—for exposure classes XFI-XF4, the minimum cement contents are ~300-340 kg/m$^3$—and the water/cement ratio relevant for mixing the concrete is between 0.45 and 0.65. The cement content in the concrete is between 0.45 and 0.65. 45 and 0.65. With regard to the thermal conductivity 0- in [W/(m–K)]; also referred to as thermal conductivity coefficient), it is generally evident that the A-values increase with the dry density of the concrete. Thus, the A-values for normal concrete are 1.3-2.3 W/(m–K), for lightweight concrete 0.2-1.35 W/(m–K) and for infra-lightweight concretes 0.04-0.3 W/(m–K). Due to the possible material variations of the aggregate (e.g.: Normal aggregate (sand, grit, gravel) for normal concrete; expanded glass, slate, clay, tuff, lava, boiler sand and natural pumice for lightweight concrete), the cement content of the type of cement and with regard to the mechanical strengths such as compressive strength and flexural strength, normal and lightweight concrete have relatively wide ranges (see DIN EN 206-1:2000—Chapter 4.3.1—Tables 7 and 8).

The disadvantage of all types of concrete is that valuable raw materials and resources such as sand, clay, expanded shale, pumice, tuff and lava are used, whose natural deposits are not infinite and should be conserved in the sense of a sustainable economy.

There is therefore a need for concrete materials that offer independence from such natural deposits through the use of alternative fillers, that can be produced and processed as easily and economically as possible and that have comparable, if not better, properties to the known concrete materials.

SUMMARY OF THE INVENTION

This task is solved by the features of the independent patent claims, wherein useful embodiments are described by the features of the dependent claims.

According to the invention, a filler is provided. The filler is produced from a mixture of comminuted, "sorted residual materials" and their conditioning with chemical reagents/compounds in the presence of water. For the purposes of the present invention, the "mixture of comminuted, sorted residual materials" (hereinafter also referred to as material group mixture) is composed of the following material groups PPK: Paper, cardboard, cardboard packaging
Plastics
Inert
Textiles
Wood which are mixed according to a mass-related material group vector and then crushed. This material group mixture is conditioned in the mixer after the addition of reagents, such as aluminum sulphate and calcium oxide or calcium hydroxide, and water. After a storage/conditioning period of 1-3 days, the resulting filler can be processed with cement and further water to form a cement-bound moulded body.

In order to increase the mechanical strength of the cement paste, kaolin and calcium formate can be added in addition to cement and water during its production from the filler material.

The cement blocks obtained in this process have a high resistance to fire.

From the point of view of recycling various residual materials, one objective is to use the filler according to the invention to produce an inexpensive aggregate for cement blocks, which, when bound in cement block, enables the production of cement-bound materials (e.g., shaped blocks and mortar) similar to the properties of lightweight concrete. The result is a material that combines a low dry bulk density and low thermal conductivity (λ) with a mechanical strength that is suitable for the construction of simple buildings.

According to the invention, a filler or concrete aggregate is provided which is produced from groups of substances by mechanical comminution and homogenisation (mixing) and chemical treatment steps. These groups of substances can also be obtained in the context of sorting residual materials, whereby, in addition to realising the recycling of residual materials, relatively inexpensive materials can also be used.

The following table lists the groups of substances that can be used and their mass fractions for the production of the filler according to the invention.

| Group of Substances | Examples for the Material group materials | Relative dry matter content/Mass % |
|---|---|---|
| Paper, cardboard, cardboard packaging (PPK) | Packaging, printed matter, cardboard folders, . . . | 20 |
| Plastics | Packaging, films, CD/DVD sleeves, . . . | 40 |
| Inert | Glass, ceramics, porcelain, stones and Stoneware, . . . | 20 |
| Textiles | Clothing textiles, curtains, carpets, fabric scraps, . . . | 15 |
| Wood | Wooden boxes, boards, chipboard, . . . | 5 |

The mixture of material groups to be used for the production of the filler is preferably crushed in a cross-flow screen shredder. This type of comminution from the material groups PPK, plastics, textiles and wood produces lumpy and fibrous particles that increase the flexural tensile strength in a cement block. The maximum expansion of the particles of the ground material is preferably 80% by mass less than 4 mm and 98% by mass less than 10 mm.

The crushed mixture is then mixed with solid aluminium sulphate ($Al_2(SO_4)_3 \cdot xH_2O$) and calcium oxide or calcium hydroxide in a conventional mixer. The aluminium sulphate can be used water-free (x=0) or with the water content typically found in the trade (x>0).

When using aluminium sulphate hydrate (e.g. $Al_2(SO_4)_3 \cdot 14H_2O$, $Al_2(SO_4)_3 \cdot 18H_2O$, ...), higher proportions by mass of aluminium sulphate hydrate than of anhydrous aluminium sulphate can be used, depending on the actual water content of the aluminium sulphate used (water of crystallisation as well as adhesive water).

Either calcium oxide (CaO) or calcium hydroxide (Ca(OH)$_2$) can be used as a component that reacts alkaline in an aqueous system, since calcium oxide reacts with water to form calcium hydroxide anyway under the aqueous conditions of the filler production.

Heat toning does not play a decisive role in the formation of calcium hydroxide from calcium oxide. In relation to the absolute dry mass of the comminuted material group mixture, 5.5 to 6 mass % of nominally anhydrous aluminium sulphate is preferably used here.

In the production of the filler, the mass ratio of aluminium sulphate shall be $(Al_2(SO_4)_3)$ to calcium oxide (CaO) is 1:1.

After mixing the materials, water is added with further mixing until an absolute target moisture of the total mixture of ~30-40 mass-% is reached.

After storage of the total mixture as described for a reaction time of preferably 1 to 3 days, the production of the filler is complete.

This moist filler may be stored so that it does not dry out before it is processed into a hardened cement paste. If it does, water can be added again to restore the necessary target moisture content.

Using the filler described above as well as cement, water and, if necessary, kaolin and calcium formate (Ca(HCOO)$_2$), a cement-bound moulding is produced.

The optional additional components kaolin and calcium formate serve to increase the mechanical strength values compressive strength and flexural tensile strength compared to the cement paste produced without kaolin and calcium formate additives.

To produce the moulding according to the invention, cement is added to the described filler in a conventional mixer while mixing. Water is then added and the whole is mixed in the mixer. The amount of cement relevant to the invention is 70±1% by mass based on the dry mass of the filler. The absolute total water content of this hardened cement paste mixture should be 42% by mass, not least for reasons of workability.

Immediately after the cement block mixture has been produced, it is worked into a formwork mould. After setting and partial hardening, the cement block can be removed from the formwork and stored until the hardening process is as complete as possible (after approx. 28 days).

This cement paste according to the invention has a dry bulk density of 1.1-103 kg/m$^3$ and a compressive and flexural strength of 5.6 N/mm$^2$ and 2.3 N/mm$^2$ respectively. The fire resistance test according to DIN 4102-2 carried out on a 500×500×240 mm$^3$ test specimen (thickness D=240 mm) showed a fire resistance corresponding to the requirements for components of fire resistance class F120.

In an alternative embodiment of the moulding, kaolin (China Clay) and cement are added to the filler according to the invention in a conventional mixer as described. A solution of calcium formate in water is then added and the whole is mixed in the mixer. In relation to the absolute dry mass of the filler, 6 mass % calcium formate is added (Ca(HCOO)$_2$) dissolved in water.

The amount of cement relevant for this variant is preferably 60±1 mass-% related to the dry mass of the filler. The mass of the added kaolin is to be referred to the cement mass used in the context of the invention and is preferably 9-9.5 mass %. The absolute total water content of this mixture of filler, kaolin, cement, calcium formate and water should preferably be ~37% by mass of the total mixture, not least for reasons of workability.

Immediately after the production of the alternative cement stone mixture, it is worked into a formwork mould. After setting and partial hardening, the cement block can be removed from the formwork and stored until the hardening process is as complete as possible (after approx. 28 days).

This alternative cement paste has a dry bulk density of 1.1-103 kg/m$^3$ and a compressive and flexural strength of 9.5 N/mm$^2$ and 3.2 N/mm$^2$ respectively. The fire resistance test according to DIN 4102-2 carried out on a 500×500×240 mm$^3$ test specimen (thickness D=240 mm) resulted in a fire resistance corresponding to the requirements for components of fire resistance class F120.

The advantages of the cement blocks according to the invention can be summarised as follows:

The cement blocks can be removed from the formwork within 8 hours, although the hardening process (up to approx. 28 days) is not yet fully completed.

The filler particles cause a lower dry bulk density of the cement blocks of 1.1-103 kg/m3 compared to normal concrete. Due to this dry bulk density, the cement blocks are to be classified as "lightweight concrete".

In the case of the cement blocks according to the invention, the entire proportion of the aggregate commonly used in "lightweight concrete" can be replaced by the filler according to the invention. Thus, a valuable new type of raw material is produced using the groups of materials described, whereby otherwise commonly used resources such as sand, suitable clays, expanded shale, pumice, tuff and lava are completely conserved. The latter also implies independence from such natural deposits.

According to DIN 4102-2 (see also DIN EN 13501-2), the cement block according to the invention shows a fire resistance class corresponding to F120. This may be surprising in view of the combustible material group components in the filler.

Taking into account that these groups of materials (PPK, plastics, textiles and wood) are subject to thermally induced changes (melting, thermal decomposition and evaporation) when exposed to heat, which absorb thermal energy and thus cause a lower temperature rise of the overall material.

Due to the porous structure of the cement paste according to the invention, the gaseous products formed during heat exposure do not lead to an increase in pressure within the cement paste, which would expose the cement paste to internal stresses with possible cracking. Furthermore, the liquefied plastics and combustible gaseous decomposition products escaping on the heat-affected surface of the hardened cement paste cause the oxygen partial pressure on the heat-affected surface to be greatly reduced during their combustion. This prevents the flame front from spreading into the hardened cement paste.

BRIEF DESCRIPTION OF THE DRAWINGS

Further features of the present invention will be apparent from the following non-limiting embodiments. Therein shows.

DETAILED DESCRIPTION OF THE INVENTION

Figure 1:
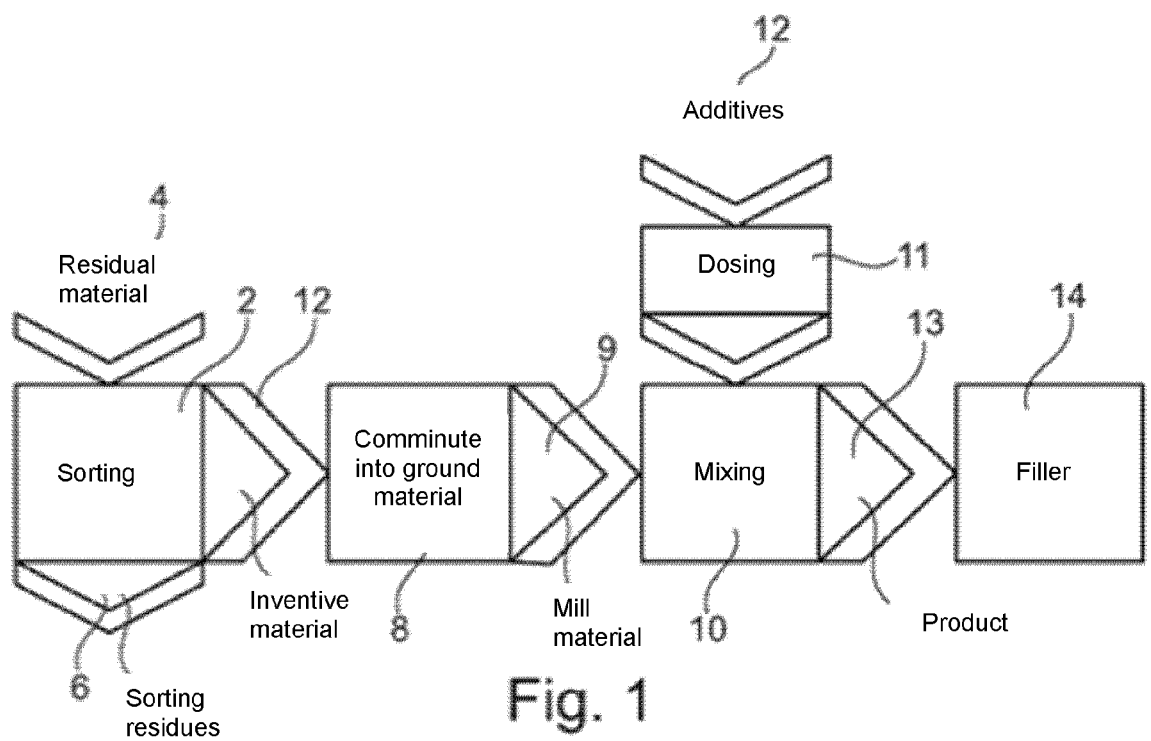
FIG. 1 a block flow diagram of the process according to the invention.

FIG. 1 shows, in the form of a block flow diagram, an embodiment of the process for producing a filler according to the invention.

In a first step 2, residual materials 4 consisting of 20% paper, cardboard, cardboard packaging, 40% plastics, 20% inert material, 15% textiles and 5% wood are sorted, whereby sorting residues 6 are separated out.

In step 12, the inventive material is transferred to a cross-flow screen flaker, where it is comminuted into ground material in step 8, with the maximum expansion of the particles of the ground material preferably being less than 4 mm in 80% by mass and less than 10 mm in 98% by mass.

The ground material 9 from step 8 is then mixed in a conventional mixer in step 10 with solid aluminium sulphate (Al2(SO4)3-xH2O) dosed in step 11 and calcium oxide as additives 12. The aluminium sulphate used is anhydrous (x=0) or has the water content typically found in commerce (x>0).

The mass ratio of aluminium sulphate (Al2(SO4)3) to calcium oxide (CaO) is 1:1.

Further water is added to the mixing process in step 10 until an absolute target moisture of the total mixture of ~30-40 mass % is reached.

Finally, in step 14, the total mixture 13 from step 10 is stored for a reaction time of 1 to 3 days, which completes the production of the filler.

Figure 2:
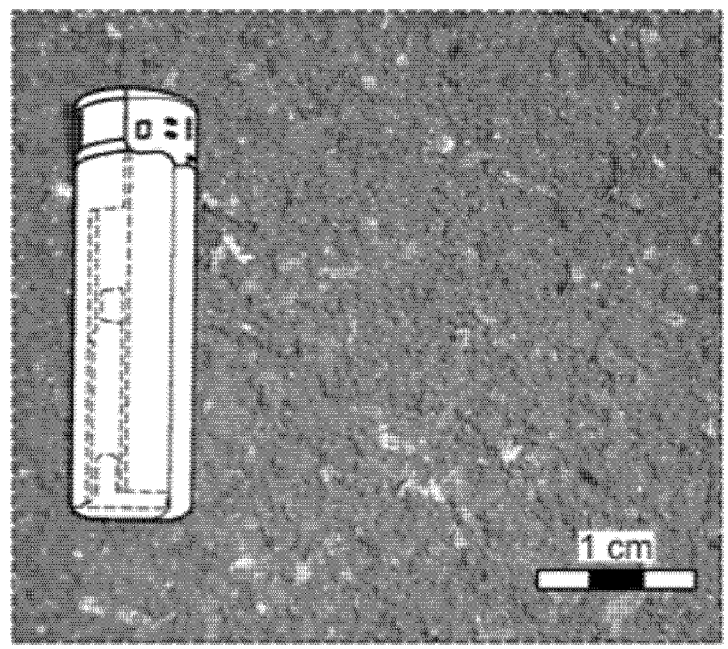
FIG. 2 an image of the filler according to the invention.

FIG. 2 shows an image of the filler, in particular revealing the structure and size of the granulation. The lighter visible in the image is for size comparison only and does not form part of the disclosure.

The invention claimed is:

1. A filler for the production of cement-bound mouldings, comprising a dry and crushed material group mixture of comminuted and sorted residual materials, wherein the comminuted and sorted material of the dry and crushed material group mixture is present in proportions of 20% by mass PPK comprising paper, cardboard, cardboard packaging, 40% by mass plastics, 20% by mass inert materials comprising glass, ceramic, porcelain, stone and earthenware, 15% by mass textiles, and 5% by mass wood.

2. The filler according to claim 1, wherein the comminuted and sorted residual materials are conditioned with chemical reagents which are aluminium sulphate and calcium oxide.

3. The filler according to claim 2, wherein the mass ratio of aluminium sulphate $(Al_2(SO_4)_3)$ to calcium oxide (CaO) is 1:1 in the conditioned comminuted and sorted residual materials.

4. The filler according to claim 1, wherein the comminuted and sorted residual materials are conditioned with chemical reagents which are aluminium sulphate and calcium hydroxide.

5. The filler according to claim 1, wherein the material groups used are at least partially provided as fibrous particles.

6. The filler according claim 1, wherein 5.5 to 6% by mass of either anhydrous or hydrous aluminium sulphate is used, based on the absolute dry mass of the dried relative dry matter of comminuted mixture of groups of substances.

7. The filler according to claim 1, comprising added water to the dry and crushed material group mixture of conditioned comminuted and sorted residual materials up to a moisture content of 30-40% by mass.

8. A moulded article made from the comprising a filler comprising a dry and crushed material group mixture of comminuted and sorted residual materials, wherein the comminuted and sorted material of the dry and crushed material group mixture is present in proportions of 20% by mass PPK comprising paper, cardboard, cardboard packaging, 40% by mass plastics, 20% by mass inert materials comprising glass, ceramic, porcelain, stone and earthenware, 15% by mass textiles, and 5% by mass wood, which is processed with cement and water to form the cement-bonded moulding.

9. The moulded article according to claim 8, wherein the amount of cement is 70±1% by mass relative to the dry mass of the filler.

10. The moulded article according to claim 8, wherein, in addition to filler, cement and water, kaolin and calcium formate are additionally contained to increase the mechanical strength of the moulding.

11. The moulded article according to claim 10, wherein, based on the absolute dry mass of the filler, 6 mass % calcium formate $(Ca(HCOO)_2)$ dissolved in water is used.

12. The moulded article according to claim 11, wherein the mass of the added kaolin is 9-9.5 mass % relative to the cement mass used.

13. The moulded article according to claim 11, wherein the amount of cement is 60±1 mass-% relative to the dry mass of the filler.

14. A method for the production of a filler comprising a dry and crushed material group mixture of comminuted and sorted residual materials, wherein the comminuted and sorted material of the dry and crushed material group mixture is present in proportions of 20% by mass PPK comprising paper, cardboard, cardboard packaging, 40% by mass plastics, 20% by mass inert materials comprising glass, ceramic, porcelain, stone and earthenware, 15% by mass textiles, and 5% by mass wood, comprising the steps:

homogenisation of the material group materials in a mixer;

comminution of the material group materials and homogenisation of the comminuted material mixture;

addition of chemical reagents aluminium sulphate, calcium oxide or calcium hydroxide and water; and storage of the mixture for a defined reaction time of 1 to 3 days.

15. The method for the production of a filler according to claim 14, wherein the material group mixture used is comminuted in a cross-flow screen flaker to produce fibrous particles.

16. The method for the production of a filler according to claim 14, wherein the comminuted material group mixture is mixed in a conventional mixer with solid aluminium sulphate $(Al_2(SO_4)_3 \cdot xH_2O)$ and calcium oxide or calcium hydroxide are added and mixed, whereby the aluminium sulphate can be used anhydrous (x=0) or with the water contents typically encountered in commerce (x>0).

17. The method for the production of a filler according to claim 16, wherein 5.5 to 6 mass % of nominally anhydrous aluminium sulphate is used, based on the absolute dry mass of the comminuted material group mixture.

18. The method for the production of a filler according to claim 14, wherein the mass-contamination from aluminum sulphate to calcium oxide is 1:1.

19. The method for the production of a filler according to claim 14, wherein water is added until an absolute target moisture content of the total mixture of ~30-40 mass % is reached.

20. A method of manufacturing a moulded article comprising the steps of:
- providing a filler comprising a dry and crushed material group mixture of comminuted and sorted residual materials, wherein the comminuted and sorted material of the dry and crushed material group mixture is present in proportions of 20% by mass PPK comprising paper, cardboard, cardboard packaging, 40% by mass plastics, 20% by mass inert materials comprising glass, ceramic, porcelain, stone and earthenware, 15% by mass textiles, and 5% by mass wood
- mixing the filler with cement and water and incorporating the composition into mould or form to produce the moulded article;
- setting the moulded article and removing the mould or shuttering;
- curing the moulded article for a defined number of days.

21. The method of manufacturing a moulded article according to claim 20, wherein, in addition to cement and water, kaolin and calcium formate are also mixed with the filler.

* * * * *